United States Patent
Bailey et al.

(10) Patent No.: US 7,480,071 B2
(45) Date of Patent: Jan. 20, 2009

(54) MAXIMIZING PERFORMANCE IN A HARDWARE IMAGE SCALING MODULE

(75) Inventors: James Ray Bailey, Shelbyville, KY (US); Joseph Yackzan, Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 586 days.

(21) Appl. No.: 10/413,201

(22) Filed: Apr. 14, 2003

(65) Prior Publication Data

US 2004/0201862 A1 Oct. 14, 2004

(51) Int. Cl.
*G06F 15/00* (2006.01)
*G06K 1/00* (2006.01)
*G03F 3/08* (2006.01)
*H04N 1/409* (2006.01)

(52) U.S. Cl. .................. 358/1.2; 116/1.6; 116/523; 116/3.26

(58) Field of Classification Search .................. 358/1.2, 358/1.16, 523, 3.26, 525
See application file for complete search history.

(56) References Cited

U.S. PATENT DOCUMENTS

| | | | |
|---|---|---|---|
| 5,025,315 A | 6/1991 | Johary et al. | |
| 5,125,072 A | 6/1992 | Ng | |
| 5,301,265 A | 4/1994 | Itoh | |
| 5,400,051 A | 3/1995 | Krueger, Jr. | |
| 5,692,109 A | 11/1997 | Shu | |
| 5,936,677 A | 8/1999 | Fries et al. | |
| 5,999,663 A * | 12/1999 | Edwards et al. | 382/298 |
| 6,058,222 A | 5/2000 | Hashimoto | |
| 6,091,426 A | 7/2000 | Hauck et al. | |
| 6,121,978 A | 9/2000 | Miler | |
| 6,331,902 B1 * | 12/2001 | Lin | 358/1.9 |

* cited by examiner

*Primary Examiner*—Douglas Q. Tran
*Assistant Examiner*—Thomas J. Lett
(74) *Attorney, Agent, or Firm*—Taylor & Aust, P.C.

(57) ABSTRACT

Lines of input image data are scaled in a first dimension, the one-dimensionally scaled lines are stored in a buffer memory until a sufficient number of lines have been stored to perform scaling equally in two dimensions, and the stored lines are then scaled in a second dimension to produce image data scaled two-dimensionally by a user-selected scaling percentage. A first image scaling method is used to scale the input image data if the user-selected scaling percentage exceeds a predetermined threshold value, such as 50 percent, and a second scaling method is used if the scaling percentage does not exceed the threshold value. The first method can be, for example, linear interpolation, and the second method can be, for example, averaging.

30 Claims, 3 Drawing Sheets

MAXIMIZING PERFORMANCE IN A HARDWARE IMAGE SCALING MODULE

BACKGROUND OF THE INVENTION

1. Field of the Invention

The present invention relates generally to image scanning, printing and similar imaging systems in which image scaling operations can be performed and, more specifically, to minimizing memory usage for scaling without discarding original image data and to maximizing image quality over a substantial range of scaling percentages.

2. Description of the Related Art

Image scaling is an important operation in so-called "multifunction" or "all-in-one" machines that perform some combination of scanning, printing, copying, facsimile and other tasks. Scaling refers to the operation that a user can initiate to reduce or enlarge an image, typically by a percentage that the user inputs. For example, a user may place a document in the machine, enter the number "30" and press a "Reduce" button and a "Copy" button or some other combination of buttons. In response, the machine scans the document, stores the scanned image data digitally in a memory, applies an algorithm to the data to reduce the size of the image by 30 percent, and prints the reduced image represented by the data.

Scaling algorithms can be implemented in hardware or software, but when implemented in hardware, such as an application-specific integrated circuit (ASIC), one objective is to minimize the amount of memory and other hardware used. Therefore, scaling algorithms used in such devices are typically as straightforward as possible, and enhancements that may be useful to some users may be sacrificed for the sake of manufacturing economy or other reasons.

Scaling percentage range is one aspect in which features are often sacrificed in favor of more straightforward algorithms. For example, most commercially available all-in-one machines allow a user to input a scaling percentage between 25 and 400 percent because the algorithms to achieve this range can be implemented relatively economically, and this range is apparently believed sufficient to satisfy the majority of consumers in the relevant market. Nevertheless, some users may wish to have a wider range from which to choose a scaling percentage.

Another such aspect in which tradeoffs are often made is the choice of scaling algorithm itself. A number of image scaling algorithms are known: pixel deletion and insertion, linear and cubic interpolation, nearest-neighbor approximation, morphology, area-mapping, and even neural network-based techniques. Although it is known that some of these algorithms provide better results under certain circumstances than others, the choice of algorithm to provide in an all-in-one machine typically involves an engineering compromise that is intended to cover the most likely circumstances under which a user is to operate the machine. For example, it is known that although pixel insertion or deletion can be implemented very efficiently in hardware, it results in severe aliasing that users perceive as poor image quality. Similarly, it is known that although bicubic interpolation results in a high image quality, it typically requires a large amount of memory to implement, making it impractical for ASIC implementation. Bilinear interpolation affords a good compromise between image quality and hardware overhead, but image quality degrades as scaling percentage decreases, due to the discarding of data that is an inherent characteristic of this algorithm. Specifically, bilinear interpolation uses as its input only two lines of pixels at a time, but full image quality will not be preserved unless a scaling algorithm uses all lines of the image.

It would be desirable to provide an image scaling architecture and method that can be efficiently implemented in an ASIC, yet does not significantly sacrifice image quality or features that may be of interest to users. The present invention addresses these problems and others in the manner described below.

SUMMARY OF THE INVENTION

In one aspect, the present invention relates to scaling lines of input image data in a first dimension, storing the one-dimensionally scaled lines in a buffer memory until a sufficient number of lines have been stored in the buffer memory to perform scaling equally in two dimensions, and then scaling the stored lines in a second dimension to produce image data scaled two-dimensionally by a user-selected scaling percentage.

In another aspect, the present invention relates to performing a first image scaling method if the user-selected scaling percentage exceeds a predetermined threshold value, and performing a second scaling method if the percentage does not exceed the predetermined threshold value. The first method can be, for example, linear interpolation, and the second method can be, for example, averaging, with the threshold value at 50 percent.

In yet another aspect, the present invention relates to locating scaled pixels on a conceptual grid having a predetermined number of potential pixel locations, such as 128, between locations of pixels of the input image data. The user-selected scaling percentage can be used to directly locate scaled pixels on the grid. A grid having a relatively large number of potential pixel locations provides a large scaling range. For example, 128 locations can provide a range of up to 12,800 percent.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Figure 1:
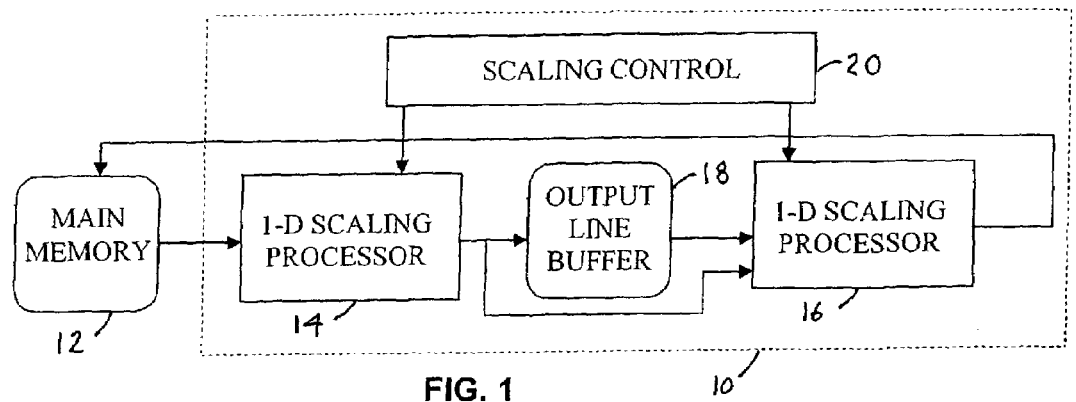
FIG. 1 is a block diagram of a two-dimensional image scaling system.

In an exemplary embodiment of the invention, illustrated in FIG. 1, an all-in-one machine (not shown) that performs some combination of scanning, printing, copying and other document processing tasks includes an application-specific integrated circuit (ASIC) 10 that, among other functions, scales image data stored in a main memory 12 of the machine.

Aspects of the all-in-one machine not relating to image scaling are not described in this patent specification because such machines are well-understood by persons skilled in the art to which the invention relates.

The image data is acquired and stored in main memory 12 by, for example, a user causing the machine to scan a document. For example, the user can place the document in the machine and press a "Copy" button, which causes the machine to scan the document, store the resulting image data, and then print the stored data. Using appropriate buttons, such as an "Enlarge/Reduce" button, the user can also request that the stored image data be scaled before it is printed or otherwise used. ASIC 10 includes for this purpose a scaling system comprising two one-dimensional scaling processors 14 and 16, a buffer memory 18, and scaling control logic 20. Scaling control logic 20 receives a scaling percentage (SP) that the user inputs using suitable buttons or other user inputs (not shown) on the machine. As described below, this system and the corresponding scaling method provide advantages that include minimizing the size of buffer memory 18 while preserving image quality by using all original image data in the scaling operation.

In accordance with the method by which the scaling system operates, scaling processor 14 receives sequential lines of image data from main memory 12 and scales each line, i.e., in one dimension (referred to for convenience as the x-dimension of the image), by the scaling percentage. Each scaled line is stored in buffer memory 18. When a sufficient number of lines have been stored to allow the image to be scaled equally in two dimensions, scaling processor 16 retrieves the stored lines and scales them in the other dimension (referred to for convenience as the y-dimension). Scaling control logic 20 controls this sequence of operation. Note that the last line need not be stored; rather, it can be provided directly from the output of scaling processor 14 to the input of scaling processor 16, thereby minimizing memory requirements. As an example, consider reducing an image by 50%: Scaling processor 14 receives a first line and scales it. The resulting scaled line is stored in buffer memory 18. Then, scaling processor 14 receives a second line a second line and scales it. The resulting scaled line is not stored, but rather received directly by scaling processor 16. Scaling processor 16 receives this second scaled line, retrieves the first scaled line from buffer memory 18, and scales the two lines together to produce image data reduced two-dimensionally by 50%. Scaling control logic 20 can then cause the scaled image data to be re-stored in main memory 12 or used in any other suitable manner. As another example, consider reducing an image by 25%: Scaling processor 14 receives a first line and scales it. The resulting scaled line is stored in buffer memory 18. Scaling processor 14 then receives a second line a second line and scales it. The resulting scaled line is also stored in buffer memory 18. Then, scaling processor 14 receives a third line and scales it. The third scaled line is then stored in buffer memory 18. Upon receiving and scaling the fourth line, however, scaling processor 14 provides the fourth scaled line directly to the input of scaling processor 16. Scaling processor 16 receives this fourth scaled line, retrieves the first, second and third scaled lines from buffer memory 18, and scales the four lines together to produce image data reduced two-dimensionally by 25%.

Figure 2:
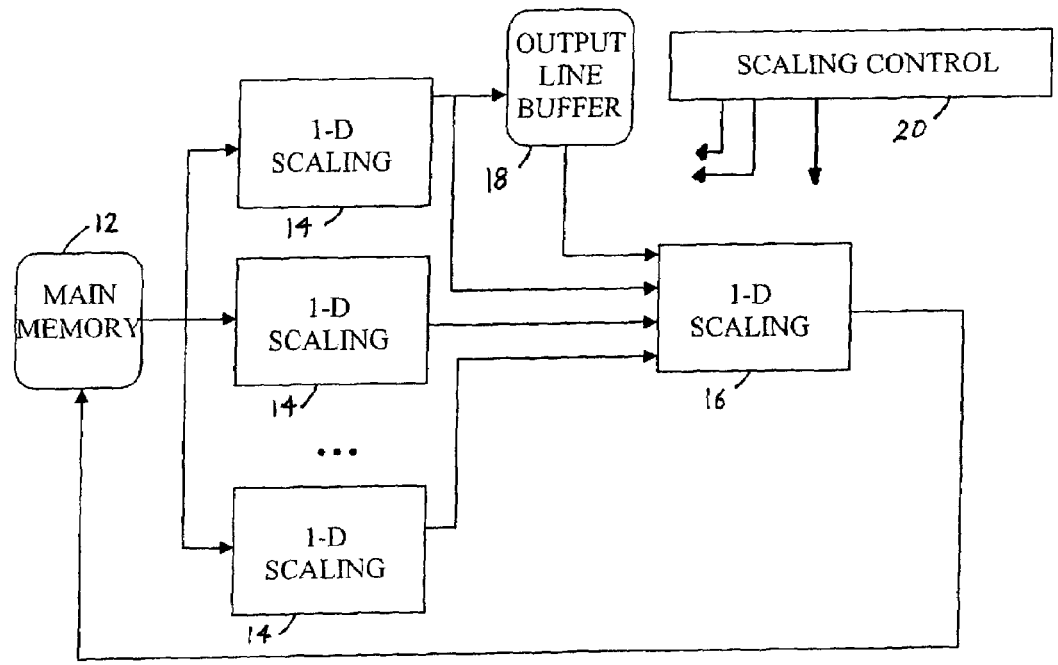
FIG. 2 is a block diagram of an alternative two-dimensional image scaling system.

As illustrated in FIG. 2, the above-described system can be generalized to a system having a plurality of parallel scaling processors 14, each of which produces scaled lines (in the x-dimension) that are stored in buffer memory 18, and a scaling processor 16 that scales the scaled lines together (in the y-dimension) to produce two-dimensionally scaled image data. The number of parallel scaling processor 14 is inversely related to the amount of buffer memory 18 that is needed to store scaled lines. Thus, once the number of lines stored in buffer memory 18 plus the number of scaling processors 14 equals the number of scaled lines necessary to produce image data scaled equally in both dimensions, the scaled lines are provided in parallel to scaling processor 16, which produces the two-dimensionally scaled image data.

Figure 3:
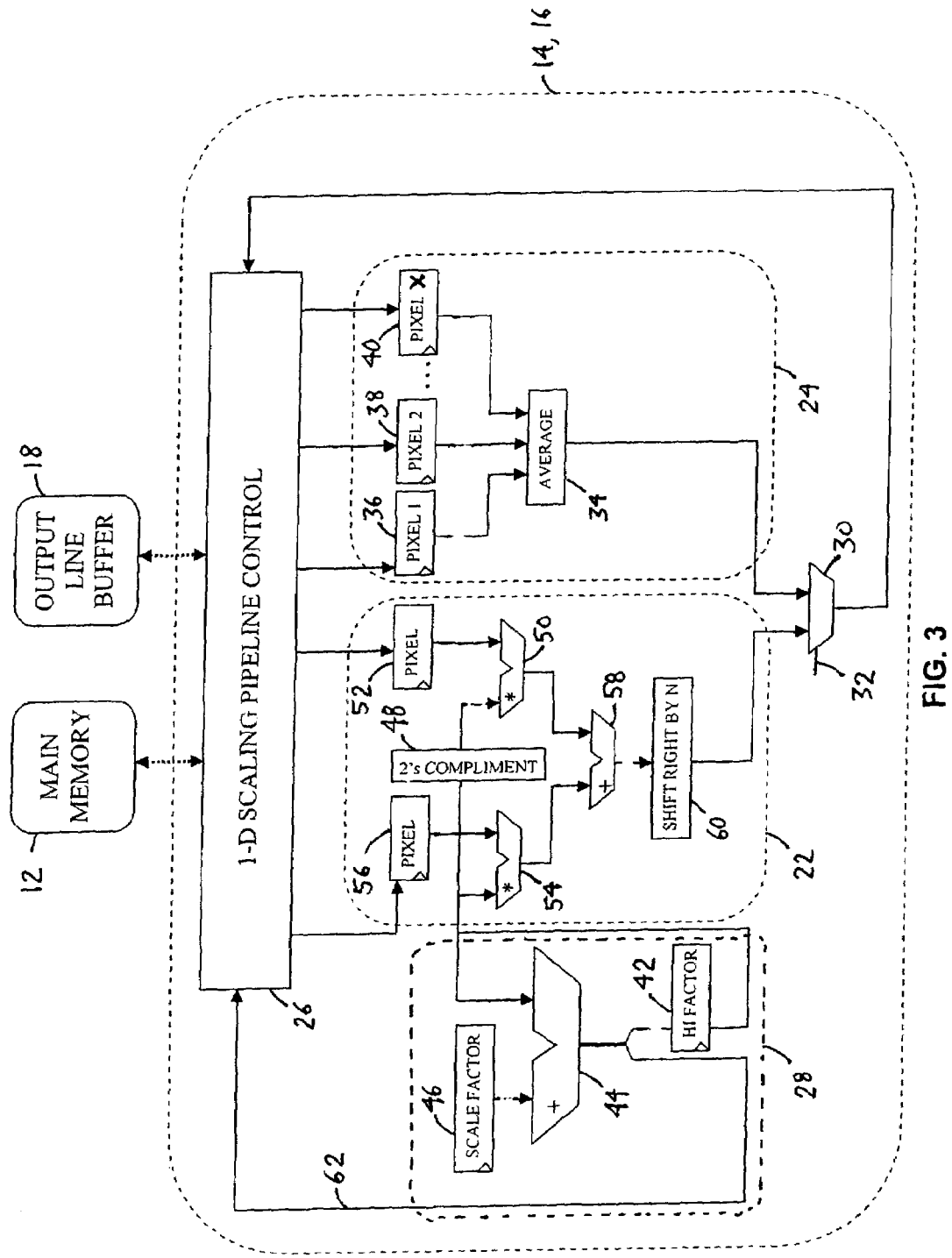
FIG. 3 is a block diagram of a one-dimensional scaling processor of the two-dimensional image scaling system.

As illustrated in FIG. 3, in an exemplary embodiment each of scaling processors 14 and 16 can include a linear interpolator 22, an averager 24, and scaling control logic that comprises a pipeline controller 26 and an index controller 28. Both linear interpolator 22 and averager 24 are included because, as described below, in this embodiment of the invention the scaling method used in a particular copy or print job can be linear interpolation or, alternatively, averaging. Both linear interpolation and averaging are well-known image scaling methods. Indeed, in other embodiments of the invention, other known scaling methods can be used in addition or alternatively to these. In the illustrated embodiment, the scaling method is selected in response to the scaling percentage (SP) that the user inputs. If the scaling percentage is less than 50%, averaging is selected as the scaling method because, as described below, it can be implemented very efficiently in hardware (e.g., ASIC 10) and produces a high quality scaled image. If the scaling percentage is greater than or equal to 50 percent, linear interpolation is selected as the scaling method because it is known that at scaling percentages below 50 percent, linear interpolation inherently discards data and thereby introduces aliasing artifacts. Although in the illustrated embodiment of the invention, the threshold value for selecting a scaling method is 50 percent, in other embodiments the threshold can have other suitable values. A selector 30 operates in response to a signal 32 received from, for example, scaling controller 20 (see FIG. 1) or other user input-related source, to select the output of either linear interpolator 22 or averager 24. Pipeline controller 26 controls the routing of the output scaled image data to main memory 12 and the routing of other data to and from main memory 12 and buffer memory 18 as described below.

Figure 4:
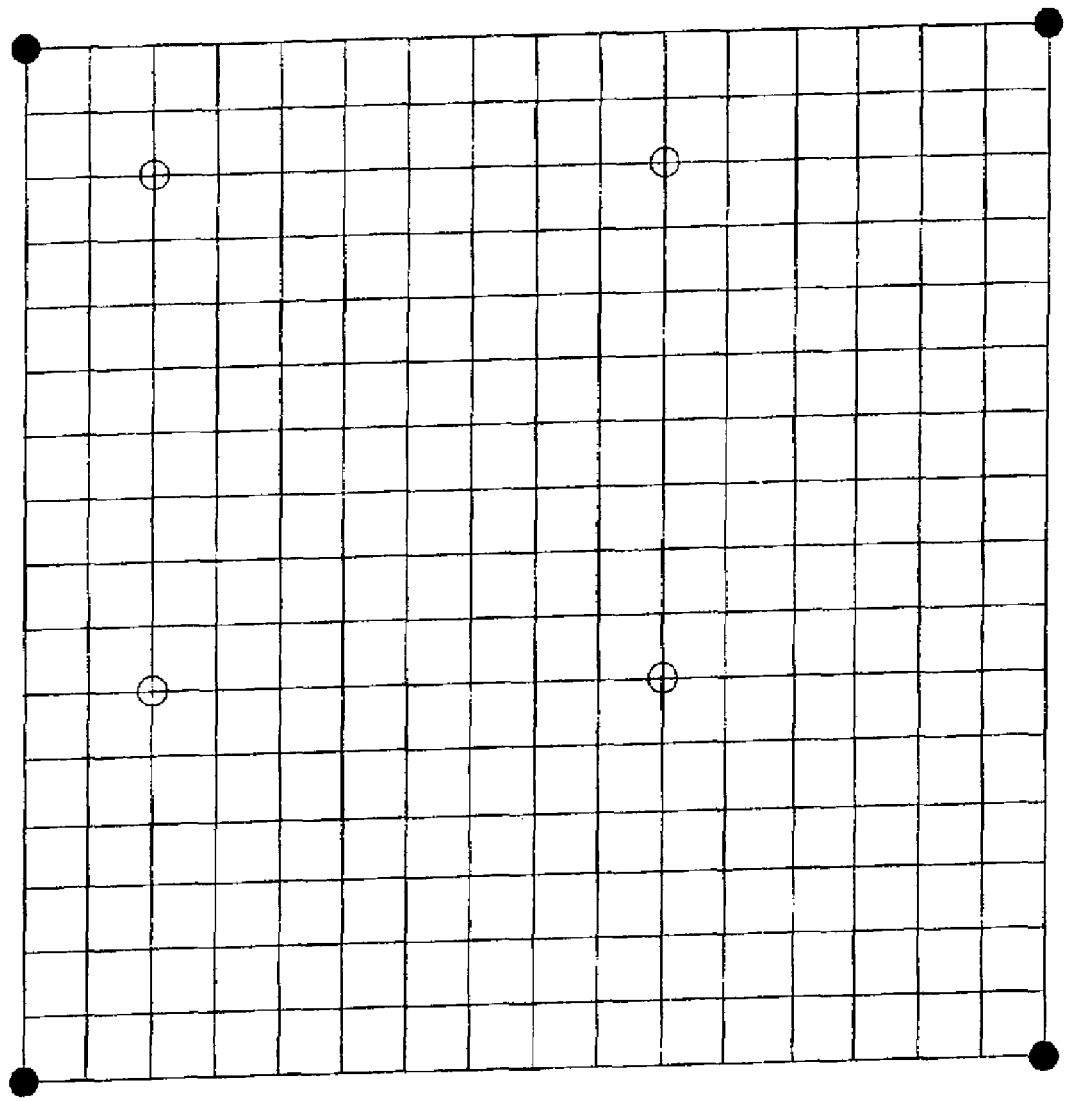
FIG. 4 illustrates a conceptual grid for locating scaled pixels.

In accordance with another aspect of the invention, illustrated in FIG. 4, as scaled image data is produced, the pixels that it comprises are located onto a conceptual grid having a predetermined number of potential pixel locations between locations of pixels of the input image data. Although for purposes of illustration and clarity, FIG. 4 illustrates a conceptual grid having only 16 such potential pixel locations, a number of potential pixel locations on the order of 128 has been found to provide suitable results, such as a balance between sensitivity to scaling percentage and a relatively large scaling range. With regard to scaling range, 128 potential pixel locations can provide a range having an upper end of 12,800 percent. With regard to sensitivity, 128 potential pixel locations can provide suitable sensitivity to changes in scaling percentage as small as about one percent. In other words, a user can typically perceive the reduction or enlargement of an image in response to changing the scaling percentage by one percent, with the change in reduction or enlargement especially noticeable at the lower end of the scaling range. The user interface (not shown) can provide a selection or menu through which the user can select a suitable scaling percentage, with scaling percentages selectable in increments of, for example, one percent at the lower end of the scaling range and 25 percent at the upper end of the scaling range. For example, the increment can be one percent below scaling percentages of about 400 percent and 25 percent at scaling percentages of 400 percent and greater, because a scaling range of up to 400 percent is common in commercially available machines, and the 25% increment can be made available for users who wish to scale at percentages greater than those available in prior machines.

In FIG. 4, the dark dots or filled circles represent pixels of the original image. When the image data is scaled in accordance with either the linear interpolation method or the averaging method, the scaled pixels will lie at corresponding locations on the grid, as indicated by the other, non-filled circles. (The locations of these pixels in FIG. 4 are shown for purposes of illustration only and are not intended to represent the result of any specific scaling method computations.)

With reference again to FIG. 3, averager 24 has averaging logic 34 that receives the values of X pixels or lines from registers 36, 38, 40, etc., and computes their average value. That is, in scaling processor 14, averaging occurs over successive groups of X pixels of a line of input image data, and in scaling processor 16, averaging occurs over groups of X successive lines. The number X can be predetermined in any suitable manner, but in the exemplary embodiment it is the number of pixels or lines needed to downscale (reduce) by the lowest scaling percentage selectable by a user. For example, if the lowest selectable scaling percentage is 25%, four registers 36, 38 (and one other, not shown), and 40 are included because four is the maximum number of pixels needed in a one-dimensional scaling computation to avoid discarding data. If the lowest selectable scaling percentage is 10%, 10 registers 36, 38 (and seven others, now shown), and 40 are included. The generalized relation is that X=ceiling(100/Y), where Y is the lowest scaling percentage selectable.

In scaling processor 14, the index 62 indicates the number of pixels to skip in a line between a pair of pixels on which interpolation is to be performed, and in scaling processor 16 it indicates the number of lines to skip between a pair of lines on which interpolation is to be performed. More specifically, index 62 is equal to (SF+HF)>>N, where the symbol ">>N" represents shifting by N bits to the right. Similarly, in scaling processor 16, the index 62, which indicates the next line to be provided (or, equivalently, the number of lines to be skipped) to interpolator 22 and averager 24, is (SF+HF)>>N. In the illustrated embodiment of the invention, in which a scaling range of about 25-400% is desired, index 62 is a three-bit value because the maximum number of lines or pixels to be skipped is four. If reduction by even less than 25 percent is desired in other embodiments of the invention, a greater number of bits can be used.

The number N is reflected in the width or number of bits of the "Hifactor" data word that the register 42 holds. Hifactor is produced by the adder 44 and is the sum of Hifactor and the scale factor that the register 46 holds. In other words, Hifactor (HF) is the lower N bits of the quantity (SF+HF). The scale factor (SF) is equal to the quantity (100/SP) multiplied by the number of potential pixel locations (M).

Index controller 28 is responsible for the above-described skipping of pixels or lines and, equivalently, for the above-described location of scaled pixels on the conceptual grid. Linear interpolation involves computing a weighted average. In interpolator 22, where M=128, the weights are Hifactor/128 and Lofactor/128, where Lofactor is the 2's-complement of Hifactor produced by 2's-complement logic 48. As illustrated in FIG. 3, the scaled pixel is the sum of the quantities (Lofactor/128 multiplied by a first pixel of the pair) and (Hifactor/128 multiplied by a second pixel of the pair). A multiplier 50 performs the former multiplication with the (first) pixel held in a register 52, and a multiplier 54 performs the latter multiplication with the (second) pixel held in a register 56. The adder 58 performs the summation. The shift register 60 performs the division by 128 by shifting the sum by N bits to the right. Note that the generalized relation between N and M is $N=\log_2(M)$.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for scaling image data, comprising the steps:
   (a) receiving a user-input scale percentage (SP);
   (b) receiving a line of input image data;
   (c) scaling the line of input image data in a first dimension to produce a one-dimensionally scaled line;
   (d) storing the one-dimensionally scaled line in a buffer memory;
   (e) repeating steps (b)-(d) until a number of lines have been stored in the buffer memory sufficient to perform scaling equally by SP in two dimensions; and
   (f) scaling all of the lines of the input image data stored in the buffer memory at steps (d) and (e) in a second dimension to produce two-dimensionally scaled image data.

2. The method claimed in claim 1 wherein step (f) comprises scaling all of the lines of the input image data stored in the buffer memory along with a final line of input image data scaled in the first dimension but not having been stored in the buffer memory.

3. The method claimed in claim 1, wherein steps (b) and (c) comprise receiving a plurality of lines of input image data and scaling the plurality of lines in parallel.

4. The method claimed in claim 1, wherein steps (c) and (f) each comprises performing linear interpolation.

5. The method claimed in claim 1, wherein steps (c) and (f) each comprises performing averaging.

6. The method claimed in claim 1, wherein steps (c) and (f) each comprises performing a first scaling method if SP exceeds a predetermined threshold value and performing a second scaling method if SP does not exceed the predetermined threshold value.

7. The method claimed in claim 6, wherein the first scaling method is linear interpolation and the second scaling method is averaging.

8. The method claimed in claim 7, wherein the predetermined threshold value is 50 percent.

9. The method claimed in claim 1, wherein:
   steps (c) and (f) each comprises locating scaled pixels on a conceptual grid having a predetermined number of potential pixel locations between locations of pixels of the input image data; and
   wherein each scaled pixel is located at a coordinate on the conceptual grid that is an integer multiple of a scale factor (SF), and wherein SF=(100/SP) multiplied by the number of potential pixel locations.

10. The method claimed in claim 9, wherein the number of potential pixel locations between locations of pixels of the input image data is 128.

11. The method claimed in claim 9, wherein step (a) comprises providing a user-selectable menu of scale percentages, selectable in increments of 1% for scale percentages below about 400% and selectable in increments of 25% for scale percentages above about 400%.

12. A digital logic apparatus for scaling image data, comprising:

(a) a first one-dimensional scaling processor for scaling a line of input image data in a first dimension in response to a user-input scaling percentage (SP) to produce a one-dimensionally scaled line;
(b) a buffer memory for storing the one-dimensionally scaled line;
(c) a second one-dimensional scaling processor having an input coupled to the buffer memory; and
(d) scaling control logic for causing the first one-dimensional scaling processor to scale lines of input image data until a number of lines have been stored in the buffer memory sufficient to perform scaling by SP in two dimensions, and for causing the second one-dimensional scaling processor to scale all lines of the input image data stored in the memory in a second dimension to produce two-dimensionally scaled image data.

13. The digital logic apparatus claimed in claim 12, wherein the input of the second one-dimensional scaling processor is also coupled to the first one-dimensional scaling processor, and the scaling control logic further causes the second one-dimensional scaling processor to scale all lines of the input image data stored in the memory along with a final line of input image data scaled by the first dimension but not having been stored in the buffer memory.

14. The digital logic apparatus claimed in claim 12, wherein the first one-dimensional scaling processor is one of a plurality of first one-dimensional scaling processors, each for scaling a line of input image data in the first dimension in parallel with the other one-dimensional scaling processors.

15. The digital logic apparatus claimed in claim 12, wherein the first and second one-dimensional scaling processors each comprises a linear interpolator.

16. The digital logic apparatus claimed in claim 12, wherein the first and second one-dimensional scaling processors each comprises an averager.

17. The digital logic apparatus claimed in claim 12, wherein the first and second one-dimensional scaling processors each comprises both a linear interpolator and an averager and selector logic for selecting the linear interpolator if SP exceeds a predetermined threshold value and selecting the averager if SP does not exceed the predetermined threshold value.

18. The digital logic apparatus claimed in claim 17, wherein the predetermined threshold value is 50 percent.

19. The digital logic apparatus claimed in claim 12, wherein:
the first and second one-dimensional scaling processors each comprises a linear interpolator; and
an index indicating a next pixel to be provided to the first one-dimensional scaling processor (or a number of pixels to be skipped) is $(SF+HF)>>N$, wherein HF is the lower N bits of $(SF+HF)$ and $SF=(100/SP)$; and
an index indicating a next line to be provided to the second one-dimensional scaling processor (or a number of lines to be skipped) is $(SF+HF)>>N$, wherein HF is the lower N bits of $(SF+HF)$, $SF=(100/SP)$, and the output of the first and second one-dimensional scaling processors represents the locations of scaled pixels on a conceptual grid comprising the potential pixel locations.

20. The digital logic apparatus claimed in claim 19, wherein a number of the potential pixel locations is 128.

21. The digital logic apparatus claimed in claim 20, wherein each scaled pixel has a value of $(LF/128*PIXEL1)+(HF/128*PIXEL2)$, wherein $LF=128-HF$.

22. A method for scaling image data, comprising the steps:
(a) receiving a user-input scale percentage (SP);
(b) receiving input image data; and
(c) scaling the input image in first and second dimensions to produce a two-dimensionally scaled image data by performing a first scaling method if SP exceeds a predetermined threshold value and performing a second scaling method if SP does not exceed the predetermined threshold value.

23. The method claimed in claim 22, wherein the first scaling method is linear interpolation and the second scaling method is averaging.

24. The method claimed in claim 23, wherein the predetermined threshold value is 50 percent.

25. The method claimed in claim 22, wherein step (c) comprises locating scaled pixels on a conceptual grid having a predetermined number of potential pixel locations between locations of pixels of the input image data, and wherein each scaled pixel is located at a coordinate on the conceptual grid that is an integer multiple of a scale factor (SF), and wherein $SF=(100/SP)$ multiplied by the number of potential pixel locations.

26. The method claimed in claim 25, wherein the number of potential pixel locations between locations of pixels of the input image data is 128.

27. The method claimed in claim 26, wherein step (a) comprises providing a user-selectable menu of scale percentages, selectable in increments of 1% for scale percentages below about 400% and selectable in increments of 25% for scale percentages above about 400%.

28. A system for scaling image data, comprising:
(a) control means for receiving a user-input scale percentage (SP);
(b) memory means for receiving input image data; and
(c) scaling processor means for scaling the input image in first and second dimensions to produce a two-dimensionally scaled image data by performing a first scaling method if SP exceeds a predetermined threshold value and performing a second scaling method if SP does not exceed the predetermined threshold value.

29. The system claimed in claim 28, wherein the first scaling method is linear interpolation and the second scaling method is averaging.

30. The system claimed in claim 29, wherein the predetermined threshold value is 50 percent.

* * * * *